March 7, 1961  R. W. RUMKER  2,973,668
AUTOMATIC TRANSMISSION
Filed Aug. 13, 1958  5 Sheets-Sheet 3
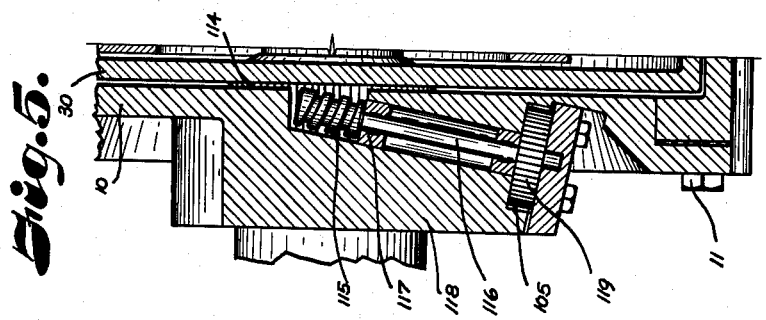
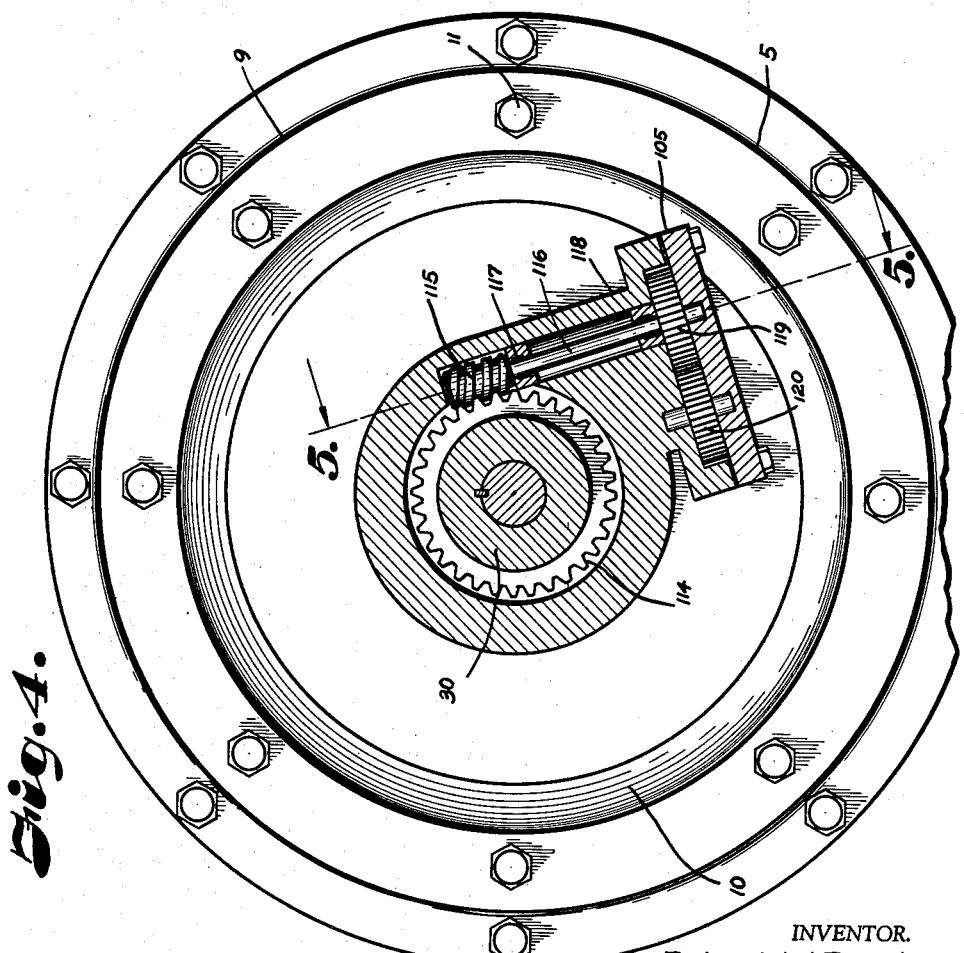
INVENTOR.
Robert W. Rumker.
BY
Fishburn and Gold
ATTORNEYS.

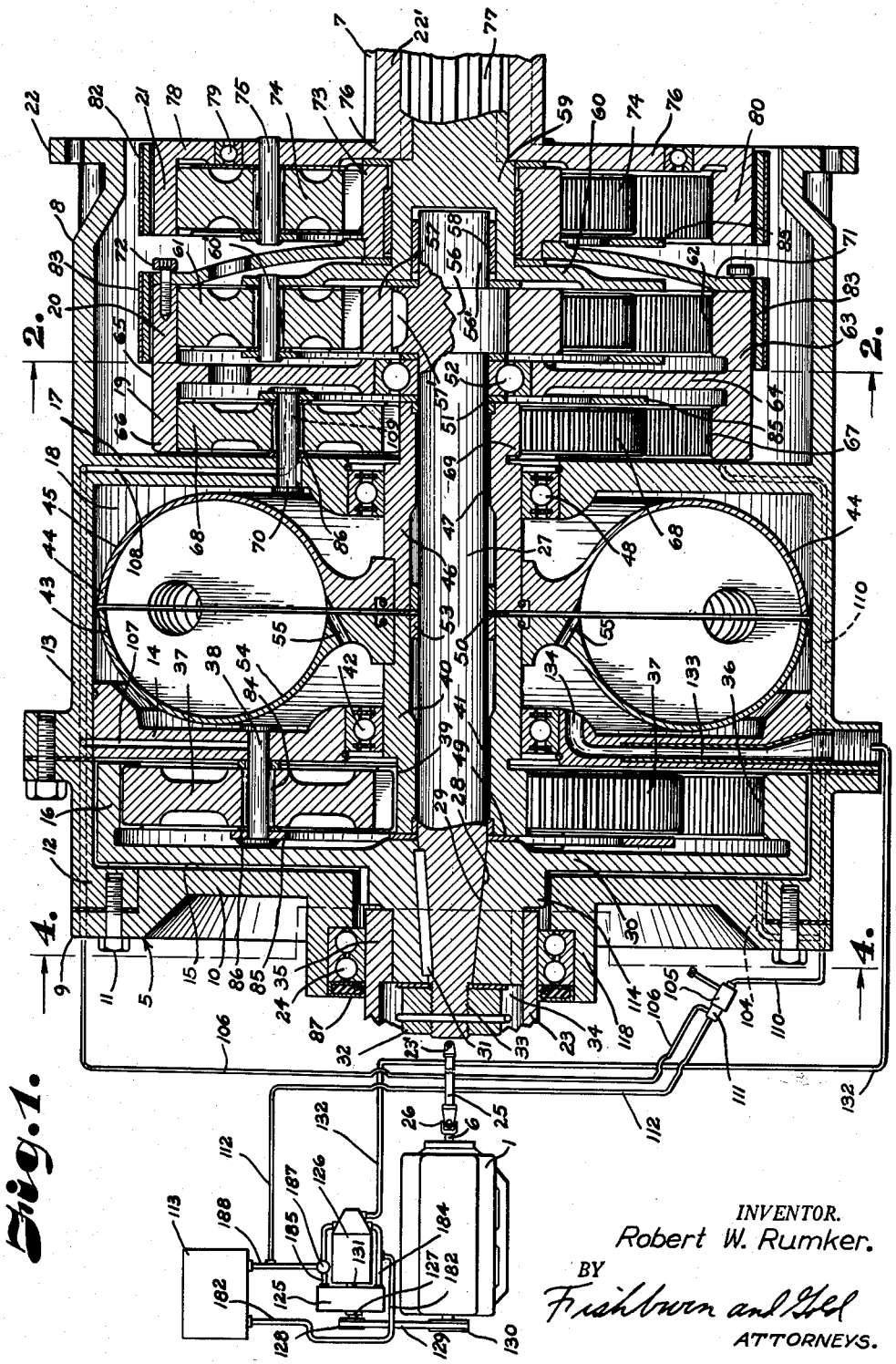

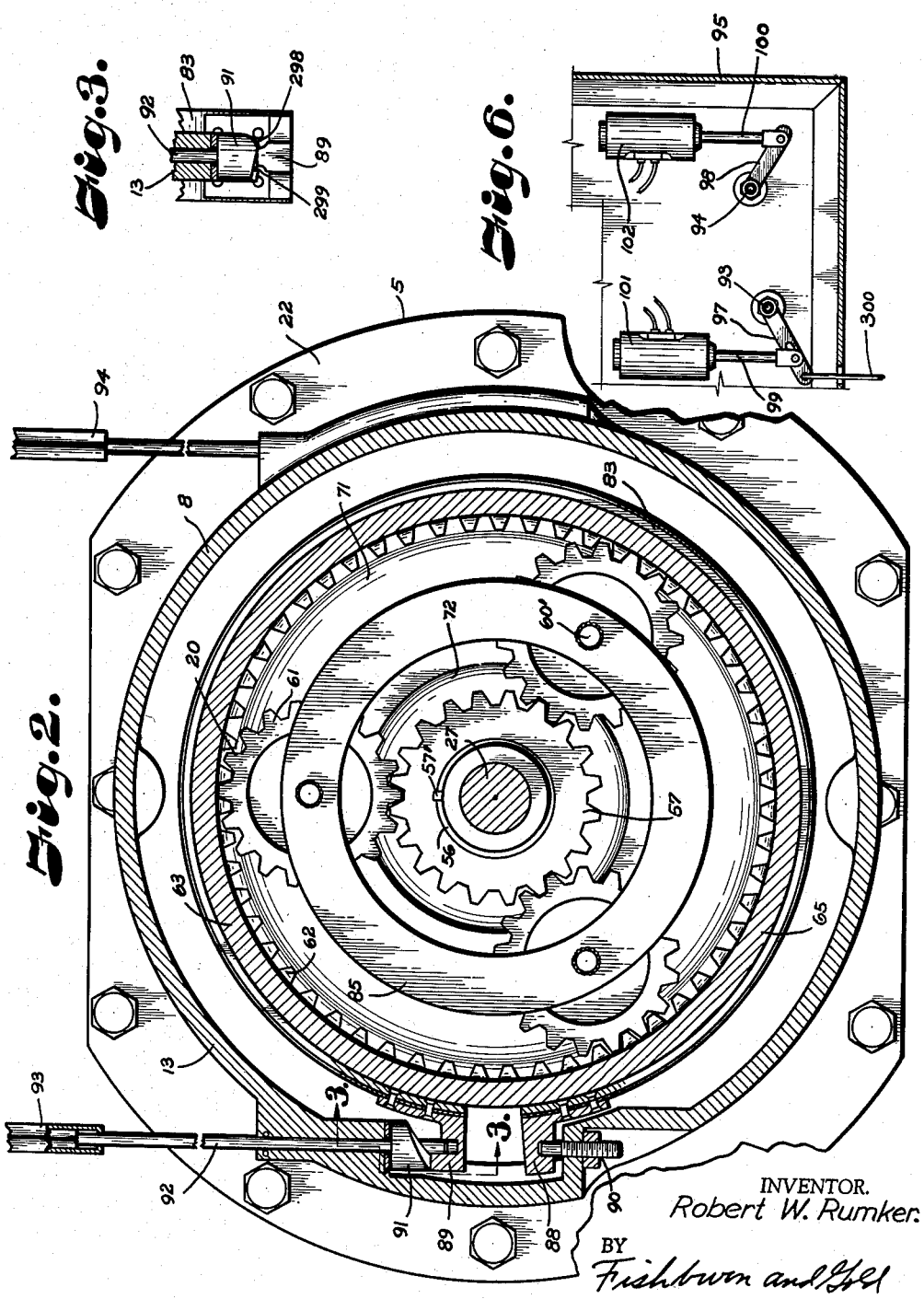

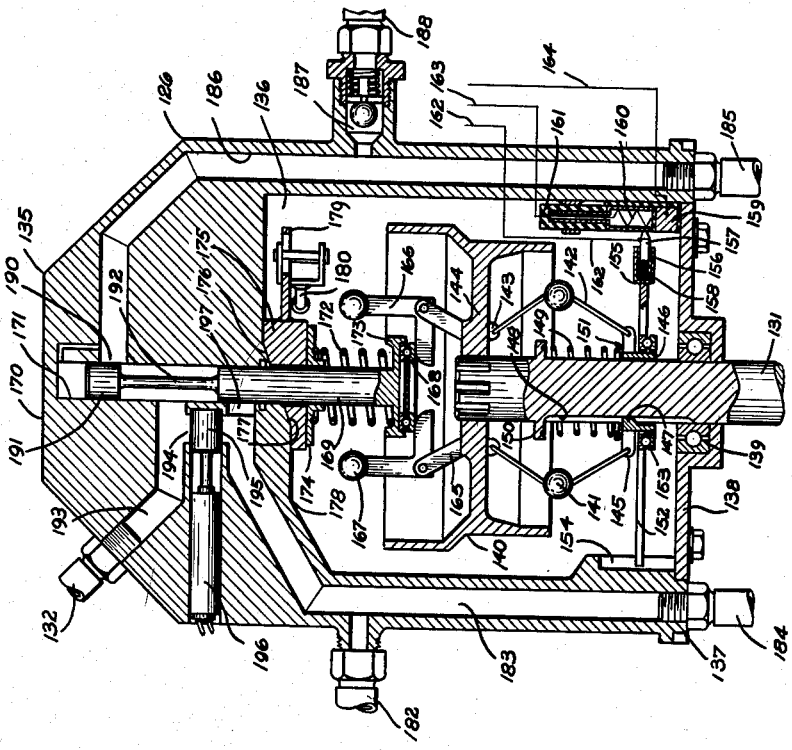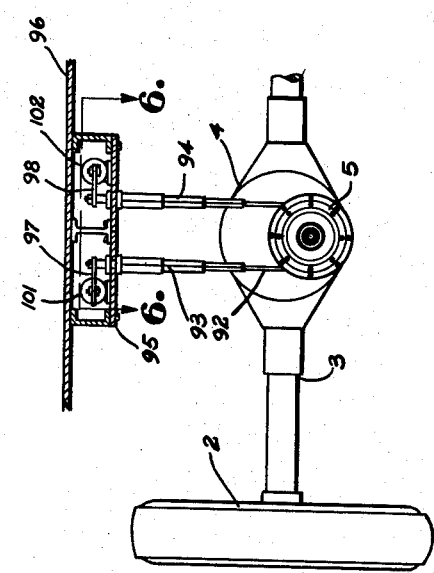
INVENTOR.
Robert W. Rumker.
ATTORNEYS.

INVENTOR.
Robert W. Rumker.
BY
Fishburn and Gold
ATTORNEYS.

United States Patent Office 2,973,668
Patented Mar. 7, 1961

2,973,668
AUTOMATIC TRANSMISSION
Robert W. Rumker, 611 E. 46th,
Kansas City North 16, Mo.
Filed Aug. 13, 1958, Ser. No. 754,767
11 Claims. (Cl. 74—688)

This invention relates to automatic transmissions, and more particularly to a fluid coupling and variable speed gearing for transmission of power as in automobiles, trucks, tractors, tanks, stationary power units and other such power units employing transmission of power from an enginge or other power source to a driven shaft at reduced, increased or identical speed or combination thereof.

Variable speed transmissions employing a fluid coupling or a torque converter and gearing are used on automobiles and are referred to as automatic transmissions. Such structures require complex controls, such as hydraulic valves, governors, clutches and brakes for effecting the various speeds which are subject of malfunction and result in expensive maintenance and repairs. Also, such transmissions are usually large and heavy and are expensive in use due to the consumption of power thereby. Some of such transmissions employ torque converters to provide increased torque for acceleration of the vehicle from standstill but have limited torque multiplication ability requiring increased engine power for satisfactory starting performance. It is further a common difficulty with such transmissions that in taxi push starting, the vehicle must attain a relatively high speed in order to turn the engine sufficiently to start same, making it very difficult to start the engine when the battery has insufficient power to operate the starter motor.

The principal objects of the present invention are to provide an improved variable speed transmission with a simplified organization of parts that eliminates the above-noted objections; to provide an improved variable speed transmission and fluid coupling unit wherein the power source may operate at maximum torque r.p.m. and maintain it from zero speed of the output shaft through the acceleration range to the overdrive ratio for maximum acceleration when desired; to provide such a variable speed transmission with a greater overdrive ratio without engine overload and damage; to provide such a transmission with operating controls wherein the braking or retardation of the output shaft is facilitated; to provide such a transmission wherein the drive may be direct connected bypassing the fluid unit at any time for improved low speed economy; to provide such a transmission and fluid unit arranged to reduce to a minimum the power consumed thereby and yet require relatively small space in height whereby in automobiles the transmission may be adjacent the differential; to provide such a transmission which can automatically adapt itself to the required torque demand and pass into drive ratios in a smooth, imperceptible manner; and to provide an improved automatic transmission and controls therefor which is easy to control and that is capable of economical manufacture and maintenance in efficient operating condition.

Other objects and advantages of this invention will become apparent from the following description taken in connection with the accompanying drawings wherein are set forth by way of illustration and example certain embodiments of this invention.

Fig. 1 is a vertical longitudinal section through the power transmission incorporating the features of the present invention, with a diagrammatic illustration of the hydraulic system.

Fig. 2 is a vertical transverse sectional view through the transmission on the line 2—2, Fig. 1.

Fig. 3 is a vertical sectional view showing the band operating cam on the line 3—3, Fig. 2.

Fig. 4 is a vertical transverse sectional view through the transmission on the line 4—4, Fig. 1.

Fig. 5 is a sectional view through the pump drive taken on the line 5—5, Fig. 4.

Fig. 6 is a horizontal sectional view showing the band operators taken on the line 6—6, Fig. 7.

Fig. 7 is a partial transverse sectional view through a vehicle showing the connection between the band operators and the transmission.

Fig. 8 is a horizontal sectional view through an hydraulic system governor.

Figure 9:
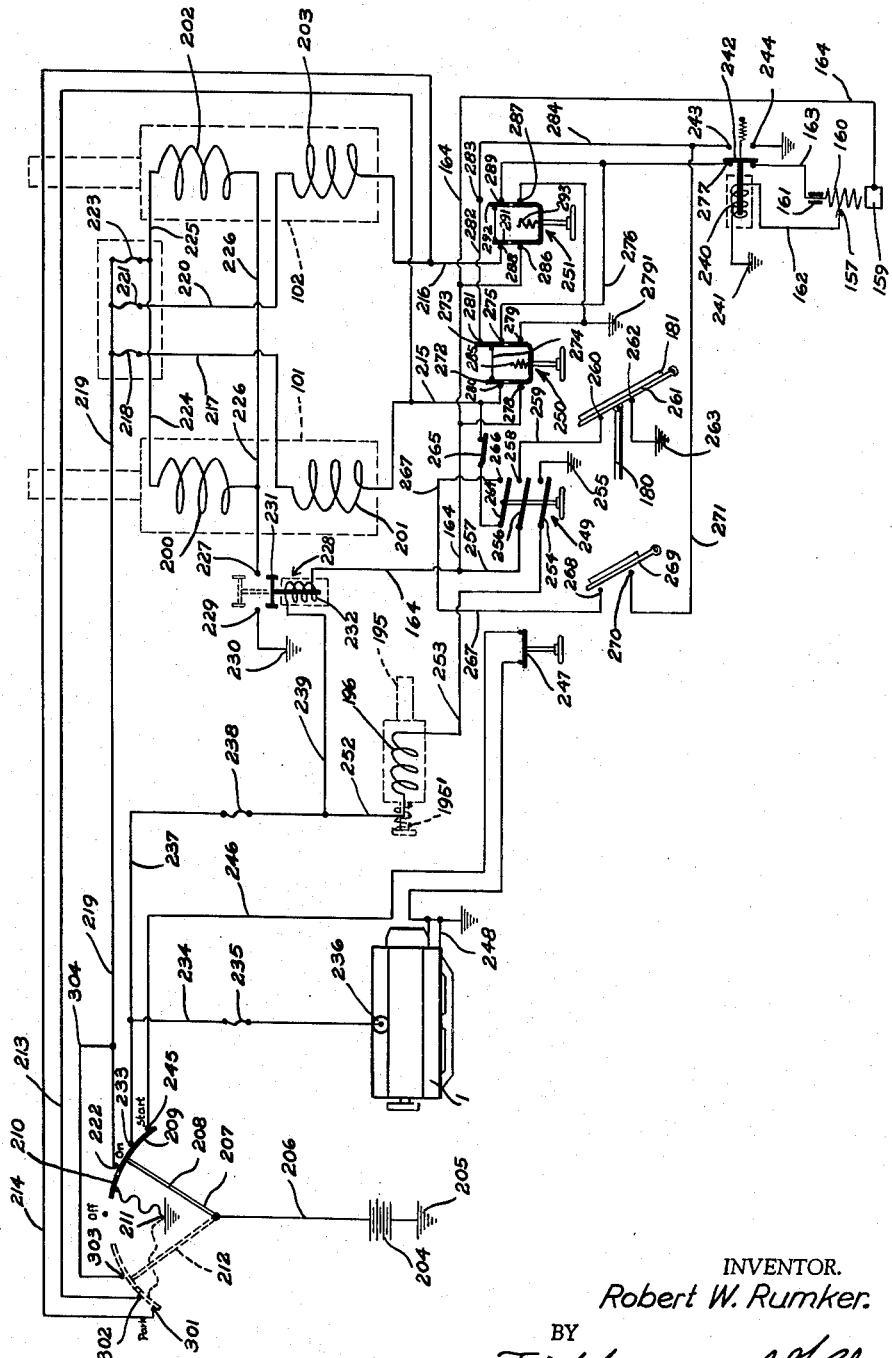
Fig. 9 is a schematic view illustrating the electrical circuits in the transmission control system.

Referring more in detail to the drawings:

The invention is illustrated as applied to a motor vehicle between the engine of the vehicle and the driving wheels; however, it is to be understood that the invention is not limited to such use and is adapted for variable speed transmission from a source of power to a driven member suitably connected to the output thereof. In the illustrated structure, the numeral 1 designates a power source such as an engine of a vehicle having traction wheels 2 on an axle 3 including a differential housing 4 enclosing the usual differential gearing therein. An automatic transmission generally designated by the numeral 5 is interposed between the engine shaft 6 and a driven member 7 such as the pinion shaft of a differential.

The automatic transmission is housed in a casing 8 which consists of several sections for convenience of assembly. The forward section 9 includes a front wall 10 secured by suitable fastening devices such as screws 11 to a peripheral portion 12 which is secured to the forward end of the main casing section 13 having a transverse partition 14 at said forward end of the main section to cooperate with the forward section in defining a chamber 15 for a first gear train or forward gear set 16.

The main casing section 13 has a partition 17 intermediate its length which cooperates with the partition 14 and said main section to define a hydraulic fluid coupling chamber 18. The portion of the casing rearwardly of the partition 17 houses gear sets 19, 20 and 21. In the illustrated structure, the rear of the casing is illustrated as being open and having flanges 22 for fastening to a differential housing 4. However, it is to be understood that in other uses the rear of the casing may be closed and an output shaft 22' supported in bearings in the same manner as the forward end of the transmission casing and the support of an input member or shaft 23, said casing 8 being such that it houses and provides support and retains oil for the various units therein. The casing 8 is supported whereby it is held against rotation and, in the illustrated structure, by the fastening to the differential housing 4.

The input shaft 23 is suitably rotatably supported by bearings 24 carried by the forward plate or wall 10, and said input shaft 23 may be the rear end section of a universal joint or a drive shaft or other means of connection to a source of power. In the illustrated structure, the input member 23 is a part of a universal joint 23' on the rear end of a drive shaft 25 which is connected by a universal joint 26 to the engine shaft 6. The input member is coaxial with a main transmission shaft 27 extending longitudinally of the casing 8. The forward end of the shaft 27 is tapered as at 28 and is secured in a tapered bore 29 of the hub of a bell gear 30 of the first gear train or set 16 by a key 31, said bell gear being held on the tapered portion of the main shaft 27 by a suitable fastening device such as a nut 32 threaded on a threaded end 33 at the forward end of said shaft. A portion of the hub of the bell gear extends into a socket 34 in the input member 23 and is drivingly connected thereto by suitable splines 35 whereby rotation of the input member 23 rotates the bell gear 30 which gear is one of the elements of the gear set 16. The bell gear 30 opens to the rear and has an internally toothed ring gear portion 36. Gears or pinions 37 are rotatably mounted on pinion bearing pins 38 carried by the partition 14, said gears or pinions 37 meshing with the ring gear portion 36 and with a gear 39 arranged at one end of a sleeve 40 having a bore 41 through which the main shaft 27 extends whereby said sleeve surrounds the main shaft and extends rearwardly into the chamber 18. The sleeve 40 is rotatably mounted in bearings 42 carried by the partition 14. The sleeve 40 terminates substantially midway the length of the chamber 18.

A pump member or impeller 43 of an hydraulic fluid coupling 44 is arranged in the chamber 18 and is fixed on the sleeve or tubular shaft 40 in a position to cooperate with a driven or turbine member 45 of said hydraulic fluid coupling. The driven or turbine member 45 of the fluid coupling is fixed on a tubular shaft or sleeve 46 having a bore 47 through which the main shaft 27 extends whereby the sleeve 46 surrounds said shaft. The sleeve 46 is rotatably mounted in bearings 48 carried by the partition 17. It is preferable to have a thrust washer 49 between the adjacent ends of the hub of the bell gear 30 and the sleeve 40, a washer 50 between the adjacent ends of the sleeves 40 and 46 and a washer 51 between the rear end of the sleeve 46 and an anti-friction bearing 52 carried on the shaft 27 as later described. It is also preferable that the end portions of the bores 41 and 47 of the sleeves 40 and 46 respectively have bearing portions 53 to aid in supporting said sleeves on said main shaft 27, particularly if the bearings 42 and 48 should become worn.

The impeller 43 and driven or turbine member 45 of the fluid coupling 44 each have toroidal shells 54 and are bladed with the blading so constructed that the impeller drives the driven or turbine member by means of fluid in the coupling and in the same direction thereof, there being inclined passages 55 communicating the interior of the toroidal shells of the fluid coupling with the chamber 18 adjacent the sleeve 40 whereby fluid from the chamber 18 may enter into the fluid coupling 44 or be withdrawn therefrom. The shaft 27 adjacent to and rearwardly of the bearing 52 has an enlarged portion 56 on which a sun gear 57 of the third gear train or set 20 is secured as by a key 57'. The shaft 27 has a reduced rearward extension 56' rotatably mounted in a bearing 58 in a hub 59 of a spider or carrier 60 which carries pinion bearing pins 60' each rotatably mounting a planet gear or pinion 61 meshing with the sun gear 57 and with an internally toothed ring gear 62 in a flange portion 63 extending rearwardly from a web 64 rotatably mounted on the bearing 52. The web 64 and flange 63 are part of a ring or brake wheel 65 which has a forward extending flange 66 provided with an internally toothed ring gear 67 of the second gear train or set 19 meshing with pinions or gears 68 which also mesh with a sun gear 69 on the rear end of the sleeve 46, said pinions or gears being rotatably mounted on bearing pins 70 carried by the partition 17. A spider or carrier 71 is secured as by fastening devices such as screws 72 to the flange 63 of the ring wheel 65, said spider being fixed to a reverse sun gear 73 of a reverse or fourth gear train or set 21 rotatably mounted on the hub 59 and meshing with planet gears or pinions 74 rotatably mounted on bearing pins 75 carried by a spider or carrier 76 having a hub connected to the hub 59 by splines 77. The hub of the spider 76 forms the output shaft 22' that is connected with the member to be driven.

A reverse brake wheel 78 is rotatably mounted by bearings 79 on the spider or carrier 76, said brake wheel having a forwardly extending flange 80 provided with internally toothed ring gear portion also meshing with the planet gears 74. A reverse brake band 82 is arranged in the casing and adapted to be tightened on the periphery of the ring wheel flange 80. Also, a forward brake band 83 is arranged in the casing 8 and adapted to be tightened on the flange 63 of the ring or brake wheel 65.

It is preferable that each of the gears 37, 61, 68 and 74 be mounted on the respective bearing pins 38, 60', 70 and 75 by means of anti-friction bearings such as needle bearings 84. It is also preferable that the bearings 24, 42, 48, 52 and 79 be anti-friction bearings such as ball bearings of the semi-seal type. It is preferable that support rings 85 be arranged to connect the free ends of the pinion gear bearing pins to aid in supporting same and that washers 86 be arranged on each side of the respective pinion gears to maintain alignment and allow lubrication clearance. It is also preferable that a suitable oil seal 87 be arranged in the bearing plate 10 exteriorly of the bearing 24 to prevent leakage from the casing.

The arrangement of the brake bands 83 is illustrated in Fig. 2, said band extending around the flange 63 and terminating in ends 88 and 89, the end 88 being engaged by an adjusting screw 90 extending from the casing whereby said screw may be turned to move the band end 88 toward or away from the band end 89, said screw 90 serving as an adjustable abutment or stop for said band end. The band end 89 is engaged by a cam 91 on a shaft 92 that extends from the casing and is connected to a telescoping shaft 93 whereby rotation of the telescoping shaft rotates the shaft 92 and cam 91 to move the band end 89 toward the band end 88 to tighten the band against the flange 63. The arrangement of the brake band 82 is the same as the brake band 83 except in reverse direction with said band 82 being operated by rotation of a telescoping shaft 94. The upper ends of the telescoping shafts 93 and 94 are supported in a housing 95 carried by the vehicle frame 96 and arms 97 and 98 are fixed to the respective shafts 93 and 94 and connected to armatures 99 and 100 of solenoids 101 and 102 respectively whereby operation of the solenoids will rotate the respective cams 91 to actuate the brake bands 83 and 82 respectively, as later described.

In order to provide for lubrication of the components, oil is pumped from the chamber 15 through a duct 104 by a pump 105 which normally delivers the oil through a duct 106 to the casing 8 and delivers said oil through passages 107 and 108 extending through the partitions 14 and 17 to the bearing pins 38 and 70 respectively to lubricate the bearings for the respective pinion gears. It is also preferable that the pins 70 have oil passages 109 communicating with the passages 108 and extending through said pins adjacent the web 64 of the ring wheel 65 whereby lubricating oil will be supplied to the gears of the gear sets 19, 20 and 21. It is preferable that the web 64 and spider 71 have suitable openings therein for lightness in weight which will also allow oil to be sprayed therethrough and lubricate the bearing 79 as well as the other bearings in the rear portion of the casing. Oil collecting in the rear portion of the casing is drawn through a passageway 110 which communicates with the duct 104. There is a relief valve 111 in the duct 106 whereby when the pressure exceeds a predetermined amount, for example, 10 pounds per square inch, the excess is delivered through a duct 112 to a tank 113. The oil pump 105 is preferably driven from a spiral gear 114 on the hub of the bell gear 30, said gear 114 meshing with a spiral gear 115 on a shaft 116 supported in bearings 117 in an extension housing 118 on the forward plate 10. The shaft 116 drives the gears 119 and 120 of the pump 105. The spiral gears 114 and 115 permit the shaft 116 to extend at an angle forwardly and downwardly, as illustrated in Figs. 4 and 5, whereby the pump is in a portion extending forwardly from the plate 10 permitting the pump to be serviced without disassembly of the other components of the transmission.

Hydraulic fluid for the fluid coupling is moved to and from the chamber 18 by means of a pump 125 under control of a governor 126. The pump 125 is preferably operatively connected with the power source driving the input shaft 23 of the transmission whereby said pump 125 is driven at all times that the power source is operated. In the illustrated structure, the pump shaft 127 has a pulley 128 thereon that is operatively connected by a belt 129 with an engine driven pulley 130. In the illustrated structure, the governor drive shaft 131 is operatively connected with the pump shaft 127; however, it is to be understood that the governor shaft 131 may be independently driven by the engine or power source whereby the governor 126 is operating at any time the power source or the input shaft 23 is operated. The fluid is supplied to the chamber 18 through a duct 132 communicating through a passage 133 illustrated as extending through the partition 14 with a port 134 communicating with the chamber 18 at the height of the desired minimum fluid level in the fluid coupling chamber 18. In the illustrated structure, the port 134 is preferably on a level with the inner portion of the toroidal shell of the lower portion of the coupling, as illustrated in Fig. 1.

The duct or flow line 132 is connected with the governor 126 whereby valves operated thereby control the movement of the hydraulic fluid to and from the compartment or chamber 18. The governor 126 consists of a housing 135 with a chamber 136 extending inwardly from one end 137 thereof. The open end of the chamber is closed by a plate 138 having a bearing 139 rotatably mounting the governor drive shaft 131 which extends into the chamber 136. The drive shaft 131 terminates intermediately of the length of the chamber, and a governor fly wheel 140 is fixed on the end of said shaft. A plurality of fly weights 141 are fixed on cables 142 intermediate the ends of the cables with one end of the respective cables secured to ears 143 on one side of a web 144 of the governor fly wheel 140. The other ends of the cables 142 are connected to ears 145 extending radially from a carrier 146 slidably mounted on the shaft 131, said carrier having a key 147 slidably engaged in a longitudinal groove 148 in said shaft whereby the carrier will rotate with the shaft and fly wheel, with the fly weights equally spaced circumferentially of said shaft.

A spring 149 is sleeved on the shaft 131 with one end engaged with an enlarged portion 150 of the shaft and the other engaged with a cup-shaped washer 151 engaging the carrier whereby the spring urges the carrier away from the fly wheel and centrifugal force acting on the fly weights 141 will cause the carrier to be moved toward the fly wheel and compress the spring 149. An arm 152 is supported on the carrier by means of bearings 153 whereby the arm is movable longitudinally of the shaft 131 with said carrier. The arm 152 extends radially from the carrier and has the outer end thereof slidably mounted in a groove 154 of the housing 135 to retain the arm against rotative movement. The other end of the arm extends diametrically oppositely from the carrier and has a socket member 155 provided with an insulated lining sleeve 156 in which is slidably mounted a carbon brush 157, a spring 158 being arranged in the insulated socket to urge the carbon brush outwardly into engagement with an idle block contact 159 at low speeds, and then during upward movement of the brush as speed of the governor is increased the brush will be moved longitudinally of a resistance coil 160, and then at high speeds the brush will move from the resistance coil into engagement with an insulating block 161. The brush 157 is connected by a conductor 162, the resistance is connected by a conductor 163 and the idle contact 159 is connected by a conductor 164 into an electric circuit, as later described.

The governor fly wheel 140 has ears 165 on the web 144 and extending oppositely therefrom relative to the ears 143. Fly weight arms 166 are pivotally mounted on the ears 165, said arms being L-shaped with weights 167 on one end thereof and the other ends of the arms extending radially inwardly from the ears and engaged with a bearing member 168 on the end of a longitudinally movable valve member 169 whereby centrifugal force acting on the weights 167 tends to move the valve member 169 toward the end 170 of the governor housing 135, said valve member being reciprocable in a valve bore 171 in said housing. A spring 172 is sleeved on the valve member with one end engaged with an enlarged portion 173 thereof adjacent the bearing 168 and the other end engaged with a collar 174 sleeved on the valve member and held by the spring in engagement with a cam member 175 rotatably mounted on the valve member and having an end cam surface 176 cooperating with an end cam surface 177 on the end 178 of the governor chamber 136 whereby rotation of the cam member 175 moves the collar 174 relative to the end 178 of the valve chamber to vary the pressure exerted by the spring 172 against the valve member tending to move same away from the end 170 of said housing.

The cam member 175 has an arm 179 connected with a rod 180 and suitable linkage to the accelerator pedal or throttle lever 181, as later described. The hydraulic fluid tank 113 is connected through a line 182 in communication with a passage 183 in the governor housing which is connected through a line 184 to the intake of the pump. The pump output is connected through a duct 185 to a passage 186 in the governor housing. Said passage 186 communicates through a bypass or relief valve 187 to a return line 188 leading to the tank 113, the bypass or relief valve being set to open when the pressure in the passage 186 is excessive, for example, more than 40 pounds per square inch. The passage 186 communicates with the valve bore 171 through a port 190 which, when the governor is in a balanced condition, is normally closed by a valve land 191. The valve member 169 has a reduced portion 192 which, when the centrifugal force of the weights 167 causes the valve member to be moved during operation of the governor toward the end 170 of the housing, will provide communication from the port 190 throuugh the valve bore to a passage 193 that communicates with the duct 132 for movement of hydraulic fluid to the coupling chamber 18. A bypass port 194 provides communication between the passage 193 and the passage 183, said port 194 normally being closed by a valve 195 urged to open position by a spring 195' moved to closed position by a solenoid 196 as later described. The passage 183 also communicates through a port 197 with the valve bore 171 when the governor fly wheel is stationary or in unbalanced condition as where the engine speed is lower than that demanded by the accelerator position, and the valve member 169 is moved to a position to close the port 190 whereby the reduced portion 192 provides registration between the passage 193 and port 197.

The electric circuit for the transmission and control thereof is particularly illustrated in Fig. 9. A solenoid 101 is for operating the band 83 or forward band, and the solenoid 102 is to operate the band 82 or reverse band. Each of said solenoids are of the double-acting type, the solenoid 101 having a winding 200 which when energized moves the solenoid to release the engagement of the band from the wheel flange 63, and the winding 201 which when energized moves the solenoid to effect engagement of the band 83 with the wheel flange 63. The solenoid 102 has a release winding 202 and an engagement effecting winding 203 which when energized will actuate the solenoid 102 to respectively release and engage the band 82 with the respective wheel flange 80.

The electrical circuit includes a battery 204, one side of which is grounded as at 205. The other side of the battery is connected through a conductor 206 to an ignition switch 207 which is preferably of a type that would be conventional for use on present day automobiles. The illustrated switch 207 has an arm 208 connected with the conductor 206 and having an elongate contact 209. A second contact 210 is supported on and insulated from the contact 209, said contact 210 being grounded as at 211. When the vehicle is being parked, the switch arm is preferably positioned as illustrated in dotted lines as at 212, Fig. 9, where the contact 210 completes the circuit between the conductors 213 and 214 which connect with conductors 215 and 216 respectively connected to one end of the windings 201 and 203 respectively. The other end of the winding 201 is connected through a conductor 217 and a fuse 218 to a conductor 219, and the other end of the winding 203 is connected through a conductor 220 and fuse 221 to the conductor 219 which leads to a contact 222. The conductor 219 is also connected through a fuse 223 to conductors 224 and 225 which lead to ends of the respective windings 200 and 202. The other ends of said windings are connected to a conductor 226 which leads to a contact 227 of a solenoid switch 228. The other contact 229 of said switch is grounded as at 230.

The switch 228 is of the momentary contact relay type wherein the switch element 231 is in the position shown in full lines when the winding 232 is deenergized and when the winding is energized, the element 231 is moved momentarily to complete the circuit between the contacts 227 and 229 and then to the position shown in dotted lines, Fig. 9.

When it is desired to start the engine 1, the switch arm 208 is swung to the position shown in solid lines, Fig. 9, to complete the circuit from the battery through the conductor 206, switch arm 208, and contact member 209, to engage the contact 222 and the contact 233 which is connected through a conductor 234 and usual ignition fuse 235 to the ignition system of the engine designated 236. The contact 233 is also connected through a conductor 237, fuse 238, branch 239, to the winding 232, the other end of said winding being connected to the conductor 164 which leads to the idle contact or block 159.

When the engine is stopped, the brush 157 is engaged with the block 159 whereby the circuit is completed through the conductor 162 to a solenoid winding 240, the other end of said winding being grounded as at 241. When the solenoid 240 is energized, it moves a spring biased switch member 242 into the position illustrated in Fig. 9. The switch member is normally spring biased to engage the contacts 243 and 244, as later described. Energizing of the winding 232 moves the switch member 231 to a momentary engagement of the contacts 227 and 229 whereby current flows from the battery through the switch member 209, contact 222, conductor 219, fuse 223, branch conductors 224 and 225, release windings 200 and 202, conductor 226, to effect release of the bands 83 and 82 respectively from their respective wheel flanges through movement of the solenoids 101 and 102 to the release position. When the ignition switch is swung to "start" position, the switch member 209 engages the contacts 222 and 233 and also a contact 245 which is connected by a conductor 246 through a switch 247 to a starter motor 248 on the engine 1. The switch 247 is a neutral selection switch and must be in closed position in order to complete the circuit to the starter motor. Otherwise, the engine cannot be started. The neutral selection switch 247 is interconnected with a drive switch 249, a direct drive switch 250 and a reverse switch 251 wherein the switch buttons are interconnected whereby only one switch may be in circuit making position at any one time, and moving a switch to a circuit making position will move the other switch buttons to circuit breaking position. These interconnected switches are of conventional type such as used on present day push buttons commonly used on push button controls of automobile automatic transmissions.

After the engine is started, the ignition switch arm 208 is retracted slightly to break the circuit with the contact 245 but to maintain the circuit through the contacts 222 and 233. This continues the circuit through the conductor 237 to a branch 252 which is connected to one end of the winding for the solenoid 196. The other end of the winding is connected through a conductor 253 to a switch arm 254 of the drive switch 249. However, the circuit to the winding of the solenoid 196 is interrupted except when the drive switch arm 254 is in circuit making position to complete the circuit to a ground as at 255. When the winding of the solenoid 196 is energized, it moves the valve 195 to close the bypass port 194. The drive switch 249 includes the switch arm 256 connected by a conductor 257 with the conductor 164 which when the drive switch is in circuit making position causes the switch arm 256 to be in circuit making contact with a contact 258 connected by a conductor 259 to a contact 260 of a switch moved by the gas pedal 181, said gas pedal switch having an arm 261 which is movable to complete the circuit from the contact 260 to a contact 262 that is grounded as at 263. The drive switch also has a switch arm 264 connected through a toggle switch type circuit breaker 265 to the conductor 215. Said switch arm is manually operated and when in circuit making position engages a contact 266 which is connected by a conductor 267 to a contact 268 of a brake pedal switch having an arm 269 adapted to complete the circuit to a contact 270 connected by a conductor 271 to the contact 243. The direct drive switch 250 has switch elements 272 and 273 that are electrically connected by a conductor 274. When the switch 250 is in engaged position, the switch element 273 engages a contact 275 connected by a conductor 276 to a contact 277 to complete a circuit through the switch member 242 to the conductor 163 when the solenoid 240 is energized. When the switch 250 is moved into contact making position, it first connects the contacts 278 and 279 which are connected to the conductor 164 and to a ground 279' respectively, and further movement of the switch 250 breaks the circuit between the contacts 278 and 279 and also completes a circuit from a contact 280, that is connected with the conductor 215, to contact 275, and further makes a circuit to a contact 281 connected by a conductor 282, contact 283 and branch 284 leading to the contact 243. Then when pressure is released on the drive switch button 250, a spring 285 moves the switch outwardly to break the circuit to the contact 281. The reverse switch 251 is of the same structure as the direct drive switch 250 and has contacts 286 and 287 connected to the conductor 164 and to the ground 279' respectively, contacts 288 and 289 connected to the conductor 216 and switch contact 277 respectively. The switch has electrically connected elements 291 and 292. The reverse switch 251 is pressed, circuit is made between the contacts 286 and 287, then the circuit is momentarily broken, at which time the circuit is made between the contacts 288 and 289, and then on further movement it is also completed between the contacts 288 and 283 where upon release of the switch button a spring 293 moves the switch slightly to break the circuit to the contact 283.

The operation of an automatic transmission and controls therefor constructed as illustrated and described with the structure in a vehicle wherein the driven shaft is operatively connected with the traction wheels of said vehicle is as follows:

With the engine stopped and the vehicle at rest, the fluid level in the fluid coupling compartment 18 should be at a minimum level or at the port 134. The ignition switch is moved to position to start the engine, and with the neutral switch 247 in circuit making position, the ignition switch member 209 will first engage the contacts 222 and 233 which will supply current to the release windings 200 and 202 of the solenoids 101 and 102 respectively to release the bands 83 and 82 from engagement with the respective wheel flanges to unlock the transmission. The circuit will then be completed through the contact 245 to the starter motor to start the engine which, when operating, drives the pump 125 and the governor 126. However, the valve 195 is still in position to open the port 194 and while the engine is idling the output of the pump will move through the relief valve 187 and duct 188 to the reservoir. If the engine speed is increased, the increase in speed of the governor will move the valve member 191 and the output from the pump will flow through the passage 186, port 190 and through the bypass port 194 and back to the pump. The engine 1, being operatively connected to the pump, turns at engine speed and direction the input member 23, the bell gear 30 and shaft 27. The bearing pins 38 of the gears or pinions 37 are stationary; therefore, rotation of the bell gear 30 rotates the pinion gears 37 to rotate the gear 39 in the opposite direction. The gear 39 is on the tubular shaft 40 to which is fixed the fluid coupling impeller 43 whereby said impeller is rotated in the reverse direction to the rotation of the input member 23 and at an increased speed, depending upon the gear ratios of the bell gear 30 and the gear 39 which is preferably on the order of 5 to 1 whereby the impeller rotates at five times the engine speed and in the reverse direction. The shaft 27 is rotated at engine speed and rotates the sun gear 57 and a resistance to movement of the vehicle holds the spider or carrier 60 stationary whereby the sun gear 57 rotates the planet gears 61 to, in turn, rotate the wheel 65. The bearing pin 70 of the pinion gears 68 being stationary, rotation of the wheel 65 rotates the pinion gears 68 and through said pinion gears rotates the gear 69 and tubular shaft 46 to rotate the driven or turbine member 45 of the fluid coupling. The driven member 45 will rotate in the same direction as the input member 23 and at a speed depending on the gear ratio; however, it has been found that a ratio of 1.75 to 1 is suitable whereby the impeller 43 and driven or turbine member 45 have relative rotation in the order of 6.75 to 1 when the transmission is in neutral or the output shaft is not turning.

For forward drive, the drive button switch 249 is moved to circuit making position completing the circuit through the solenoid winding 196 to move the valve 195 to close the by-pass port 194 which will result in some fluid being pumped through the duct 132 to the chamber 18 during idle speed of the engine, but insufficient fluid to cause the vehicle to creep. The circuit between the contacts 260 and 262 remains open; however, current flows through the solenoid winding 232, conductor 164, idle block 159, brush 157, to the winding 240 to move the switch member 242 into engagement with the contacts 277. When the gas pedal 181 is pressed to increase the engine speed from idle, a circuit is made between the contacts 260 and 262. The gas pedal also moves the connection 180 to rotate the cam member 175, and the increased speed of the governor and the fly wheel 140 thereof causes the fly ball weights 167 to sense the demand and move the valve member 191 whereby more fluid from the pump can enter the chamber 18. Also, the increased speed of the governor causes the brush 157 to move upwardly into engagement with the resistance 160. As the speed is increased from idle, there is a point when the brush 157 contacts both the idle block and lower end of the resistance 160 to maintain ground for the solenoid 240. If the engine speed is raised above a predetermined amount, for example, 500 r.p.m., the brush 157 moves off of the engagement with the resistance 160 breaking the circuit to the solenoid winding 240 whereby the spring will cause the switch member 242 to move into circuit making engagement with the contacts 243 and 244. As the increased volume of fluid is supplied to the fluid coupling chamber 18, it raises the level of the fluid therein whereby when sufficient fluid volume is obtained in the chamber along with the reltive difference in rotation of the impeller and driven members 43 and 45 respectively, the fluid moves into the toroidal shells and tends to cause the impeller and driven or turbine member to move together. This results in a decrease in the relative rotation between the impeller and driven or turbine member, and for the ratio decrease it also changes the relative speed between the wheel 65 and sun gear 57 whereby the carrier or spider 60 and the output shaft 22' thereon must rotate, causing the vehicle to move. Fluid will be continued to be pumped into the fluid unit until a balance is reached between the engine r.p.m. and the vehicle speed. The amount of fluid required to fill the chamber 18 is relatively small and the pump can quickly supply that quantity so the response in the fluid coupling is fast. If the throttle is opened further causing more r.p.m., balance will occur at a higher vehicle speed. Any time such balance occurs, the fluid unit will be completely full and under pressure, and when such balance is reached the transmission will be in full overdrive. Under a very light load, it is estimated that full overdrive can be reached at approximately 20 miles per hour. From idle to full overdrive, there is no actual shift, only a gradual change in ratio. Any time any appreciable difference in balance occurs, either by increased throttle setting or decreased engine speed, as while climbing a hill, the slowing of the rotation of the wheel 140 will cause the fly ball weights to reduce the pressure on the valve plunger 169 whereby the spring will move said valve to provide communication between the passages 193 and 183 and then the pump evacuates some of the fluid from the fluid coupling thereby permitting some slippage between the impeller and driven or turbine member, and a change in the ratio between the speeds of the input member 23 and the output member 22', the amount of the change depending upon the load, with the lower speed ratio allowing the engine to produce sufficient power by increasing or maintaining the r.p.m. to efficiently handle the load without excessively loading the engine. It is preferable that the linking arrangement from the gas pedal or throttle to the governor sensing collar is arranged whereby fully opened throttle will be reached at the three-fourths point of foot feed pedal travel. Beyond this point, the throttle in the carburetor will remain open but the governor will receive a false signal for less r.p.m. until at the floor position the foot pedal has moved the sensing collar to a position wherein the governor calls for maximum engine torque r.p.m.; this may be adjusted for different engines. This provides a passing ratio with the engine remaining at the maximum torque r.p.m. as long as the foot pedal is on the floor, or until the transmission gets to full overdrive. Then the r.p.m. will increase until maximum r.p.m. is obtained from the engine. This system gives maximum possible acceleration in relation to engine power and load at any time from zero miles per hour to top speed. If the full throttle is desired with neither full engine r.p.m. nor maximum torque r.p.m., then by setting the foot feed pedal at any point from three-quarters to full floor position, the corresponding engine r.p.m. will be maintained until the transmission reaches full overdrive.

The circuit breaker 265 provides a brake assist, and if the brake pedal is depressed at speeds wherein the brush 157 is engaged with the insulation 161, current will flow from the battery through the switch arm 208, contact 222, conductor 219, fuse 218, conductor 217, winding 201, conductor 215, circuit breaker 265, switch arm 264, contact 266 and conductor 267 to the brake operated switch and then through the conductor 271, switch element 242 to the ground. This energizes the solenoid coil 201 to operate the solenoid 101 to engage the band 83 with the respective drum wheel 65 to provide a gripping and slowing of the driven member 7 to assist the conventional brakes. When the speed is reduced and the brush 157 engaged with the resistance 160 or idle block 159, the brake assist circuit is interrupted by switch 242. Also, the use of the brake assist is optional as the circuit breaker switch 265 may be manually operated to open the circuit and leave same in open condition until said switch is manually moved to circuit making position.

When a direct drive is desired, bypassing the fluid unit, the switch 250 is pressed inwardly and if any of the switches 247, 249 or 251 are engaged or in circuit making position, they will be disengaged to break the respective circuit controlled thereby. The making of the circuit by the switch 250, when the vehicle is stationary, and the engine at idle speed, will cause current to flow from the battery through the ignition switch arm, contact 233, conductor 237, fuse 238, conductor 239, winding 232, conductor 164, block 159, brush 157, conductor 162, winding 240 to the ground 241 to energize the solenoid and move the switch into engagement with the contact 277 whereby current will flow through the conductor 219, fuse 218, conductor 217, solenoid winding 201, conductor 215, contact 280, switch elements 272 and 273, contact 275, conductor 276 through the switch to the resistance 160, when the engine speed is increased to move the brush 157 into engagement with the resistance 160, whereby the circuit is completed through the conductor 162, winding 240, to the ground 241. This energizes the winding 201 of the solenoid 101 to move the arm 97 and shaft 93 to rotate the cam 91 to apply the band 83 to hold the wheel 65 against rotation. The brush 157 and resistance 160 are to retard the full energization of the solenoid windings to allow some slippage as the bands are applied, thereby eliminating any jerk in starting. Also, when the drive switch 249 is moved to circuit breaking position, the circuit through the winding 196 is broken, deenergizing said winding whereby the spring 195' moves the valve 195 to open the bypass 194 which causes the pump 125 to evacuate the fluid from the torque converter unit. The cam 91 on the shaft 93, when moved to apply the band 83 in tight engagement with the wheel 65, has a high point 298 near the end of the applying movement of the solenoid and arm 97 and beyond that high point there is a decline 299 which, in effect, moves the cam past center whereby friction will hold the cam in applying position until it is moved to band releasing position by action of the solenoid or by action of a cable 300 for manual release, as later described. The cam on the shaft 94 is of the same construction and operates in the same manner. When the band 83 is in holding position relative to the wheel 65, and the accelerator is depressed to increase the speed of the engine, the engine drives through the input member 23, hub of the bell gear 30, shaft 27, sun gear 57 and planet gear 61. Since the wheel 65 is held stationary, the planet gears will rotate on the internally toothed ring gear 62 to effect rotation of the carrier 60 in the same direction as the rotation of the shaft 27. Said carrier, being connected with the output member 22', provides a direct drive thereto with the rotation of the output member being at a speed ratio determined by the ratio of the gears 57, 61 and 62. At higher speeds, when the brush 157 moves out of contact with the resistance 160, the winding 240 will be deenergized and the switch element 242 engaged with the contacts 243 and 244, and the circuit through the winding 201 of the solenoid 101 will be interrupted; however, the shape of the cam 91 will hold the band 83 engaged with the wheel 65 to continue the direct drive in a forward direction until the direct drive switch 250 is moved to circuit interrupting position or until the engine reaches idle whereby the winding 232 is energized momentarily and the switch 231 completes the circuit through the release winding 200 of the solenoid 101 to swing the arm 97 and move the cam 91 to release the band 83. When the solenoid 240 is deenergized by the engine speed being such that the brush 157 engages the insulation 161, the switch element 242 engages contacts 243 and 244, and then the direct drive switch 250 and reverse switch 251 may be alternately operated to rock the vehicle as when getting out of mud and the like. To operate in reverse direction, the switch 251 is moved to circuit making position whereby the circuit is completed from the battery through the ignition switch arm 208, conductor 219, fuse 221, branch 220, winding 203 of the solenoid 102, conductor 216, contact 288, switch elements 291 and 292, contact 289, contact 277, switch element 242, conductor 163 and resistance 160, brush 157, conductor 162, winding 240 and to the ground 241 when the engine is operated at sufficient speed whereby the governor moves the brush 157 into engagement with the winding 160. When the solenoid winding 203 is energized, the solenoid 102 is actuated to move the armature 100 and arm 98 to rotate the shaft 94 to move the cam thereon to tighten the band 82 on the flange 80 of the internal gear 78. When the reverse circuit is energized, the valve 195 is in bypass open position and the fluid in the fluid coupling chamber 18 is evacuated by the pump 125 to a level of the port 134 thereby deactivating the fluid coupling. Then operation of the engine will cause rotation of the input member 23 whereby the drive is through the hub of the bell gear 30, shaft 27, sun gear 57, planet gears 61, whereby the ring gear 62 will rotate in the opposite direction to the shaft 27. The ring gear 62 will carry with it the spider 71 to rotate the sun gear 73 in the opposite direction to the shaft 27, and the sun gear 73 rotates the planet gears 74 but the internal gear 78 being held stationary will cause the planet gears 74 to move the carriage 76 and rotate same and in turn drive the output member 22' in the reverse direction to the shaft 27 and the engine, the speed ratio in said reverse being dependent upon the gear ratios in the planetary gear sets operated thereby. During all of this operation, there will be some leakage from the fluid coupling chamber 18 through the bearings into the areas of the gear units. This oil will be scavenged therefrom by the pump 105 which is driven from the gear 114, said pump delivering the oil or fluid through the duct 106 back through the passages 107 and 108 to circulate the oil through the bearing pins 38 and 70 to supply a continuous lubrication to the gear units whenever the input member 23 is rotated. If the pressure from the pump 105 exceeds approximately 10 pounds per square inch, the relief valve 111 will cause the excess fluid to pass through the conduit 112 to the tank 113.

When it is desired to park the vehicle, ignition switch arm is turned beyond the "off" position as at 212 whereby the contact member 210 will engage with the park contacts 301 and 302. The other arcuate portion 209 of the ignition switch arm contact will be engaged with the contact 303 which is connected by a conductor 304 to the conductor 219. Thereby current will flow from the battery through the conductor 206, switch arm 208, contact member 209, contact 303, conductor 304, conductor 219, fuses 218 and 221, conductors 217 and 220, solenoid windings 201 and 203, and conductors 213 and 214, to the contacts 301 and 302, contact member 210 through the conductor 211 to the ground, energizing the band engaging coils 201 anad 203 of the solenoids 101 and 102 respectively thereby operating the bands 82 and 83 to engage same with the ring gear 78 and wheel 65 to hold same against rotation, thereby locking the transmission. Then the ignition switch is moved to "off" position whereby the key can be removed therefrom. It should be noted that in this arrangement the engine cannot operate in the park position. However, it should be understood that other arrangements for engaging the output member 22' or structure keyed thereto could be utilized to hold the vehicle in park position.

In order to provide for taxi starting, the ignition switch is turned to "on" position, energizing the solenoid switch 228 to move same by the contacts 227 and 229 to energize the release windings 200 and 202 of the solenoids 101 and 102, thereby releasing the bands 82 and 83. This requires small current that is usually available in a battery even though it has insufficient charge to operate the starter of the engine. Then as the vehicle is pushed, the cable 300 is suitably actuated to move the lever arm 97 and the cam 91 into band applying position thereby tightening the band 83 on the wheel 65 whereby it operates in the manner above described for direct drive. The forward movement of the vehicle then turns the engine to effect starting of same. This taxi starting is possible at vehicle speeds as used with manual transmissions. If the transmission is in park position and the battery completely dead, the cable 300 may be operated to release the forward band 83, and the arm 98 of the reverse band operated to release said reverse band 82 from engagement with the ring gear 78 whereby the vehicle may be towed or otherwise moved.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In a transmission mechanism, the combination of a drive member, a driven member, a hydraulic fluid coupling including an impeller member and a turbine member, a gear train connecting the drive member and impeller for rotating said impeller, a housing surrounding the fluid coupling and defining a fluid chamber in which said fluid coupling operates, a second gear train for completing a power train between the turbine member and the driven member, a pump operatively associated with the drive member to be driven in accordance with speed changes thereof and having an inlet and an outlet, a flow duct communicating with the fluid coupling chamber, a bypass duct between the pump outlet and inlet, a pressure responsive means in said bypass duct for opening same in response to a predetermined pressure therein, a governor driven in accordance with speed changes of the drive member, means operative to selectively effect communication of the flow duct with the pump outlet and pump inlet, and means under control of said governor for regulating the delivery of fluid from the pump outlet to the flow duct whereby when fluid is delivered to the fluid coupling chamber the rotation of the impeller is effective to drive the turbine member and when fluid is withdrawn from the fluid coupling chamber the effectiveness of rotation of the impeller to drive the turbine member is reduced.

2. In a transmission mechanism, the combination of a drive member, a driven member, a hydraulic fluid coupling including an impeller member and a turbine member, means connecting the drive member and impeller for rotating said impeller, a housing surrounding the fluid coupling and defining a fluid chamber in which said fluid coupling operates, a gear set for completing a power train between the turbine member and the driven member and including a sun gear connected to said drive member, a ring gear, a plurality of planetary pinions meshing with the sun and ring gear, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and an outlet, a flow duct communicating with the fluid coupling for delivery of fluid to and from said fluid coupling chamber, valve means operative to selectively effect communication of said flow duct with the pump inlet and pump outlet, a stationary brake means selectively engageable with said first ring gear to hold said first ring gear against rotation, and means cooperating with said stationary brake means for actuating said valve means controlling supply of the fluid to the fluid coupling chamber to effect communication of the flow duct with the pump inlet whereby when the stationary brake means holds said first ring gear stationary fluid is withdrawn from the fluid coupling chamber and drive is effected from the drive member through the first sun gear and plurality of planetary pinions and carrier therefor to the driven member.

3. In a transmission mechanism, the combination of a drive member, a driven member, a hydraulic fluid coupling including an impeller member and a turbine member, means connecting the drive member and impeller for rotating said impeller, a housing surrounding the fluid coupling and defining a fluid chamber in which said fluid coupling operates, a gear set for completing a power train between the turbine member and the driven member and including a sun gear connected to said drive member, a ring gear, a plurality of planetary pinions meshing with the sun and ring gear, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and outlet, a flow duct communicating with the fluid coupling chamber, a governor driven in accordance with speed changes of the drive member, means operative to selectively effect communication of the flow duct with the pump outlet and pump inlet, means under control of said governor for regulating the delivery of fluid from the pump outlet to the flow duct whereby when fluid is delivered to the fluid coupling chamber the rotation of the impeller is effective to drive the turbine member and when fluid is withdrawn from said fluid coupling chamber the effectiveness of rotation of the impeller to drive the turbine member is reduced, a stationary brake means selectively engageable with said first ring gear to hold said first ring gear against rotation, and means cooperating with said stationary brake means for withdrawing fluid from the fluid coupling chamber whereby holding of said first ring gear stationary effects the drive from the drive member through the first sun gear and plurality of planetary pinions and carrier therefor to the driven member.

4. In a transmission mechanism, the combination of a drive member, a driven member, a hydraulic fluid coupling including an impeller member and a turbine member, a gear set connecting the drive member and impeller for rotating said impeller, a housing surrounding the fluid coupling and defining a fluid chamber in which said fluid coupling operates, a gear set for completing a power train between the turbine member and the driven member and including a sun gear connected to said drive member, a ring gear, a plurality of planetary pinions meshing with the sun and ring gear, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and outlet, a flow duct communicating with the fluid coupling chamber, a bypass between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a stationary brake means selectively engageable with said first ring gear to hold said first ring gear against rotation, and means cooperating with said stationary brake means for actuating the bypass valve to open said bypass whereby the fluid is withdrawn from the fluid coupling chamber and holding of said first ring gear stationary effects the drive from the drive member through the first sun gear and plurality of planetary pinions and carrier therefor to the driven member.

5. In a transmission mechanism, the combination of a drive member, a driven member, a hydraulic fluid coupling including an impeller member and a turbine member, means connecting the drive member and impeller for rotating said impeller, a housing surrounding the fluid coupling and defining a fluid chamber in which said fluid coupling operates, a gear set for completing a power train between the turbine member and the driven member and including a sun gear connected to said drive member, a ring gear, a plurality of planetary pinions meshing with the sun and ring gear, and a planetary pinion carrier continuously connected to the driven member, a second ring gear fixed to the first ring gear, a second sun gear connected to said reaction member, a plurality of pinions rotatably mounted on stationary axes and meshing with the second sun and ring gears, a pump operatively associated with the drive member and having an inlet and outlet, a flow duct communicating with the fluid coupling chamber, a bypass between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a reverse power train including a third sun gear connected to the first ring gear for rotation therewith, a third carrier continuously connected with the driven member, a third ring gear rotatably mounted relative said third carrier, a set of planetary pinions carried on said third carrier and meshing with said third sun and ring gears, a stationary brake means selectively engageable with said third ring gear to hold same against rotation, and means cooperating with said stationary brake means for opening the pump bypass whereby fluid is withdrawn from the fluid coupling chamber and holding of said third ring gear stationary effects the drive of the driven member in reverse direction to the rotation of the drive member.

6. In a transmission mechanism, the combination of a drive member, a driven member, a hydraulic fluid coupling including an impeller member and a turbine member, a gear set connecting the drive member and impeller for rotating said impeller, a housing surrounding the fluid coupling and defining a fluid chamber in which said fluid coupling operates, a second gear set for completing a power train between the reaction member and the driven member and including a sun gear connected to said drive member, a ring gear, a plurality of planetary pinions meshing with the sun and ring gear, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and outlet, a flow duct communicating with the fluid coupling chamber, a bypass between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a stationary brake means selectively engageable with said first ring gear to hold said first ring gear against rotation, and means cooperating with said stationary brake means for actuating the bypass valve to open said bypass whereby the fluid is withdrawn from the fluid coupling chamber and holding of said first ring gear stationary effects the drive from the drive member through the first sun gear and plurality of planetary pinions and carrier therefor to the driven member, a reverse power train including a third sun gear connected to the first ring gear for rotation therewith, a third carrier continuously connected with the driven member, a third ring gear rotatably mounted relative said third carrier, a set of planetary pinions carried on said third carrier and meshing with said third sun and ring gears, a second stationary brake means selectively engageable with said third ring gear to hold same against rotation, and means cooperating with said second stationary brake means for opening the pump bypass whereby fluid is withdrawn from the fluid coupling chamber and holding of said third ring gear stationary effects the drive of the driven member in reverse direction to the rotation of the drive member.

7. In a transmission mechanism, the combination of a drive member, a driven member, a hydraulic fluid coupling including an impeller member and a turbine member, means connecting the drive member and impeller for rotating said impeller, a housing surrounding the fluid coupling and defining a fluid chamber in which said fluid coupling operates, a gear set for completing a power train between the turbine member and the driven member and including a sun gear connected to said drive member, a ring gear, a plurality of planetary pinions meshing with the sun and ring gear, and a planetary pinion carrier continuously connected to the driven member, a gear train connecting said first ring gear to said turbine member, a pump operatively associated with the drive member and having an inlet and outlet, a flow duct communicating with the fluid coupling chamber, a bypass duct between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a stationary brake means selectively engageable with said first ring gear to hold said first ring gear against rotation, means cooperating with said stationary brake means for actuating the bypass valve to open said bypass whereby the fluid is withdrawn from the fluid coupling chamber and holding of said first ring gear stationary effects the drive from the drive member through the first sun gear and plurality of planetary pinions and carrier therefor to the driven member, a reverse power train including a second sun gear connected to the first ring gear for rotation therewith, a second carrier continuously connected with the driven member, a second ring gear rotatably mounted relative said second carrier, a set of planetary pinions carried on said second carrier and meshing with said second sun and ring gears, a second stationary brake means selectively engageable with said second ring gear to hold same against rotation, an electric circuit, an ignition switch in said electric circuit and having three positions which are off, on and park, electric actuators for each of said first and second stationary brake means, each of said electric actuators including a winding which when energized will effect engagement of the respective brake means and a winding which when energized will effect release of said respective brake means, and means connecting the brake engaging windings in circuit when the switch is in park position to engage the respective brake means.

8. In a transmission mechanism, the combination of a drive member, a driven member, a hydraulic fluid coupling including an impeller member and a turbine member, means connecting the drive member and impeller for rotating said impeller, a housing surrounding the fluid coupling and defining a fluid chamber in which said fluid coupling operates, a gear set for completing a power train between the turbine member and the driven member and including a sun gear connected to said drive member, a ring gear, a plurality of planetary pinions meshing with the sun and ring gear, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and outlet, a flow duct communicating with the fluid coupling chamber, a bypass duct between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a stationary brake means selectively engageable with said first ring gear to hold said first ring gear against rotation, means cooperating with said stationary brake means for actuating the bypass valve to open said bypass whereby the fluid is withdrawn from the fluid coupling chamber and holding of said first ring gear stationary effects the drive from the drive member through the first sun gear and plurality of planetary pinions and carrier therefor to the driven member, a reverse power train including a third sun gear connected to the first ring gear for rotation therewith, a third carrier continuously connected with the driven member, a third ring gear rotatably mounted relative said third carrier, a set of planetary pinions carried on said third carrier and meshing with said third sun and ring gears, a second stationary brake means selectively engageable with said third ring gear to hold same against rotation, an electric circuit, an ignition switch in said electric circuit and having three positions which are off, on and park, electric actuators for each of said first and second stationary brake means, each of said electric actuators including a winding which when energized will effect engagement of the respective brake means and a winding which when energized will effect release of said respective brake means, and means connecting the brake engaging windings in circuit when the switch is in park position to engage the respective brake means.

9. In a transmission mechanism, the combination of a drive member, a driven member, a hydraulic fluid coupling including an impeller member and a turbine member, a gear set connecting the drive member and impeller for rotating said impeller, a housing surrounding the fluid coupling and defining a fluid chamber in which said fluid coupling operates, a second gear set for completing a power train between the turbine member and the driven member and including a sun gear connected to said drive member, a ring gear, a plurality of planetary pinions meshing with the sun and ring gear, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and outlet, a flow duct communicating with the fluid coupling chamber, a bypass duct between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a stationary brake means selectively engageable with said first ring gear to hold said first ring gear against rotation, means cooperating with said stationary brake means for actuating the bypass valve to open said bypass whereby the fluid is withdrawn from the fluid coupling chamber and holding of said first ring gear stationary effects the drive from the drive member through the first sun gear and plurality of planetary pinions and carrier therefor to the driven member, a reverse power train including a third sun gear connected to the first ring gear for rotation therewith, a third ring gear rotatably mounted relative said third carrier, a set of planetary pinions carried on said third carrier and meshing with said third sun and ring gears, a second stationary brake means selectively engageable with said third ring gear to hold same against rotation, means cooperating with said second stationary brake means for opening the pump bypass whereby fluid is withdrawn from the fluid coupling chamber and holding of said third ring gear stationary effects the drive of the driven member in reverse direction to the rotation of the drive member, an electric circuit, an ignition switch in said electric circuit and having three positions which are off, on and park, electric actuators for each of said first and second stationary brake means, each of said electric actuators including a winding which when energized will effect engagement of the respective brake means and a winding which when energized will effect release of said respective brake means, means connecting the brake engaging windings in circuit when the switch is in park position to engage the respective brake means, means connecting the release windings in circuit when the switch is in on position, and a momentary switch actuated by movement of the said first-named switch to on position to momentarily complete the circuit to the release windings to release the respective brake means when the switch is turned to on position.

10. In a transmission mechanism, the combination of a drive member, a driven member, a hydraulic fluid coupling including an impeller member and a turbine member, means connecting the drive member and impeller for rotating said impeller, a housing surrounding the fluid coupling and defining a fluid chamber in which said fluid coupling operates, a gear set for completing a power train between the turbine member and the driven member and including a sun gear connected to said drive member, a ring gear, a plurality of planetary pinions meshing with the sun and ring gears, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and outlet, a flow duct communicating with the fluid coupling chamber, a bypass duct between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a stationary brake means selectively engageable with said first ring gear to hold said first ring gear against rotation, means cooperating with said stationary brake means for actuating the bypass valve to open said bypass whereby the fluid is withdrawn from the fluid coupling chamber and holding of said first ring gear stationary effects the drive from the drive member through the first sun gear and plurality of planetary pinions and carrier therefor to the driven member, a reverse power train including a third sun gear connected to the first ring gear for rotation therewith, a third carrier continuously connected with the driven member, a third ring gear rotatably mounted relative said third carrier, a set of planetary pinions carried on said third carrier and meshing with said third sun and ring gears, a second stationary brake means selectively engageable with said third ring gear to hold same against rotation, means cooperating with said second stationary brake means for opening the pump bypass whereby fluid is withdrawn from the fluid coupling chamber and holding of said third ring gear stationary effects the drive of the driven member in reverse direction to the rotation of the drive member, an electric circuit, electric actuators for each of said first and second stationary brake means, each of said electric actuators including a winding which when energized will effect engagement of the respective brake means and a winding which when energized will effect release of said respective brake means, and means selectively connecting the brake engaging windings in circuit to engage the respective brake means and hold the respective ring gear stationary.

11. In a transmission mechanism, the combination of a drive member, a driven member, a hydraulic fluid coupling including an impeller member and a turbine member, a gear set connecting the drive member and impeller for rotating said impeller, a housing surrounding the fluid coupling and defining a fluid chamber in which said fluid coupling operates, a second gear set for completing a power train between the turbine member and the driven member and including a sun gear connected to said drive member, a ring gear, a plurality of planetary pinions meshing with the sun and ring gears, and a planetary pinion carrier continuously connected to the driven member, a second ring gear fixed to the first ring gear, a second sun gear connected to said turbine member, a plurality of pinions rotatably mounted on stationary axes and meshing with the second sun and ring gears, a pump operatively associated with the drive member and having an inlet and outlet, a flow duct communicating with the fluid coupling chamber, a bypass duct between the pump outlet and inlet, a governor driven in accordance with speed changes of the drive member, means under control of said governor for regulating the delivery of fluid from the pump to the flow duct, a valve controlling said bypass whereby when the bypass is closed the fluid from the pump is delivered to the fluid coupling chamber and when the bypass is open the pump removes fluid from said fluid coupling chamber, a stationary brake means selectively engageable with said first ring gear to hold said first ring gear against rotation, means cooperating with said stationary brake means for actuating the bypass valve to open said bypass whereby the fluid is withdrawn from the fluid coupling chamber and holding of said first ring gear stationary effects the drive from the drive member through the first sun gear and plurality of planetary pinions and carrier therefor to the driven member, a reverse power train including a third sun gear connected to the first ring gear for rotation therewith, a third carrier continuously connected with the driven member, a third ring gear rotatably mounted relative said third carrier, a set of planetary pinions carried on said third carrier and meshing with said third sun and ring gears, a second stationary brake means selectively engageable with said third ring gear to hold same against rotation, means cooperating with said second stationary brake means for opening the pump bypass whereby fluid is withdrawn from the fluid coupling chamber and holding of said third ring gear stationary effects the drive of the driven member in reverse direction to the rotation of the drive member, an electric circuit, an ignition switch in said electric circuit and having three positions which are off, on and park, electric actuators for each of said first and second stationary brake means, each of said electric actuators including a winding which when energized will effect engagement of the respective brake means and a winding which when energized will effect release of said respective brake means, means connecting the brake engaging windings in circuit when the switch is in park position to engage the respective brake means, means connecting the release windings in circuit when the switch is in on position, and a momentary switch actuated by movement of the said first-named switch to on position to momentarily complete the circuit to the release windings to release the respective brake means when the switch is turned to on position, and means selectively connecting the brake engaging windings in circuit when the switch is turned to on position for effecting engagement of the respective brake with the respective ring gear to hold same stationary.

References Cited in the file of this patent

UNITED STATES PATENTS

| | | |
|---|---|---|
| 2,078,287 | Seibold | Apr. 27, 1937 |
| 2,223,715 | Berger | Dec. 3, 1940 |
| 2,383,981 | Lysholm | Sept. 4, 1945 |
| 2,515,831 | McFarland | July 18, 1950 |
| 2,536,473 | Sinclair | Jan. 2, 1951 |
| 2,570,467 | Malachowski | Oct. 9, 1951 |
| 2,583,312 | Wayto | Jan. 22, 1952 |
| 2,656,675 | Coar | Oct. 27, 1953 |
| 2,876,656 | Herndon | Mar. 10, 1959 |
| 2,894,609 | Tattersall | July 14, 1959 |